(12) United States Patent
Jennings

(10) Patent No.: US 9,329,016 B1
(45) Date of Patent: May 3, 2016

(54) WELD GAUGE

(71) Applicant: Sean Jennings, Bakersfield, CA (US)

(72) Inventor: Sean Jennings, Bakersfield, CA (US)

( * ) Notice: Subject to any disclaimer, the term of this patent is extended or adjusted under 35 U.S.C. 154(b) by 124 days.

(21) Appl. No.: 14/073,755

(22) Filed: Nov. 6, 2013

(51) Int. Cl.
   *G01B 5/02* (2006.01)
   *G01B 5/00* (2006.01)
   *B23K 31/12* (2006.01)

(52) U.S. Cl.
   CPC ............ *G01B 5/0037* (2013.01); *B23K 31/125* (2013.01)

(58) Field of Classification Search
   CPC ...................................................... G01B 5/0037
   USPC ........................................................ 33/561.1
   See application file for complete search history.

(56) References Cited

U.S. PATENT DOCUMENTS

| | | | | |
|---|---|---|---|---|
| 255,130 | A | * | 3/1882 | Barker .......................... 33/561.1 |
| 438,401 | A | * | 10/1890 | Brown ............................ 33/200 |
| 2,266,457 | A | * | 12/1941 | Wolff ........................... 33/561.1 |
| 2,949,674 | A | * | 8/1960 | Wexler ......................... 33/561.1 |
| 4,637,142 | A | * | 1/1987 | Baker .............................. 33/833 |
| 4,924,580 | A | * | 5/1990 | Garofalo et al. ................ 33/832 |
| 5,014,441 | A | * | 5/1991 | Pratt ............................ 33/561.1 |
| 5,337,489 | A | * | 8/1994 | Mustafa .......................... 33/832 |
| 5,546,668 | A | * | 8/1996 | Ahdoot ........................... 33/527 |
| 6,505,410 | B1 | * | 1/2003 | Lycan ............................. 33/473 |

FOREIGN PATENT DOCUMENTS

| | | | |
|---|---|---|---|
| CH | 203464 | A * | 3/1939 |
| DE | 626528 | C * | 2/1936 |

* cited by examiner

*Primary Examiner* — Christopher Fulton
(74) *Attorney, Agent, or Firm* — R. Scott Kimsey, Esq.; Klein De Natale Goldner, et al.

(57) ABSTRACT

An improved weld gauge includes a housing having a top, a bottom, and first and second side edges. The housing has a shoulder at the second side edge. A first cutout is defined in the housing between the side edges. The cutout includes at least one edge. A second cutout is defined in the housing at the second edge. Hatches are spaced along the edge of the first cutout. Pins are slidingly disposed between the top and the bottom of the housing. Each of the pins has a first end and a second end, and the first end of each of the pins extends into the second cutout of the housing. The first ends of the pins are positioned to contact a surface to be measured, and measurement of that surface is accomplished by comparing the position of the second ends of the pins to the hatches.

19 Claims, 13 Drawing Sheets

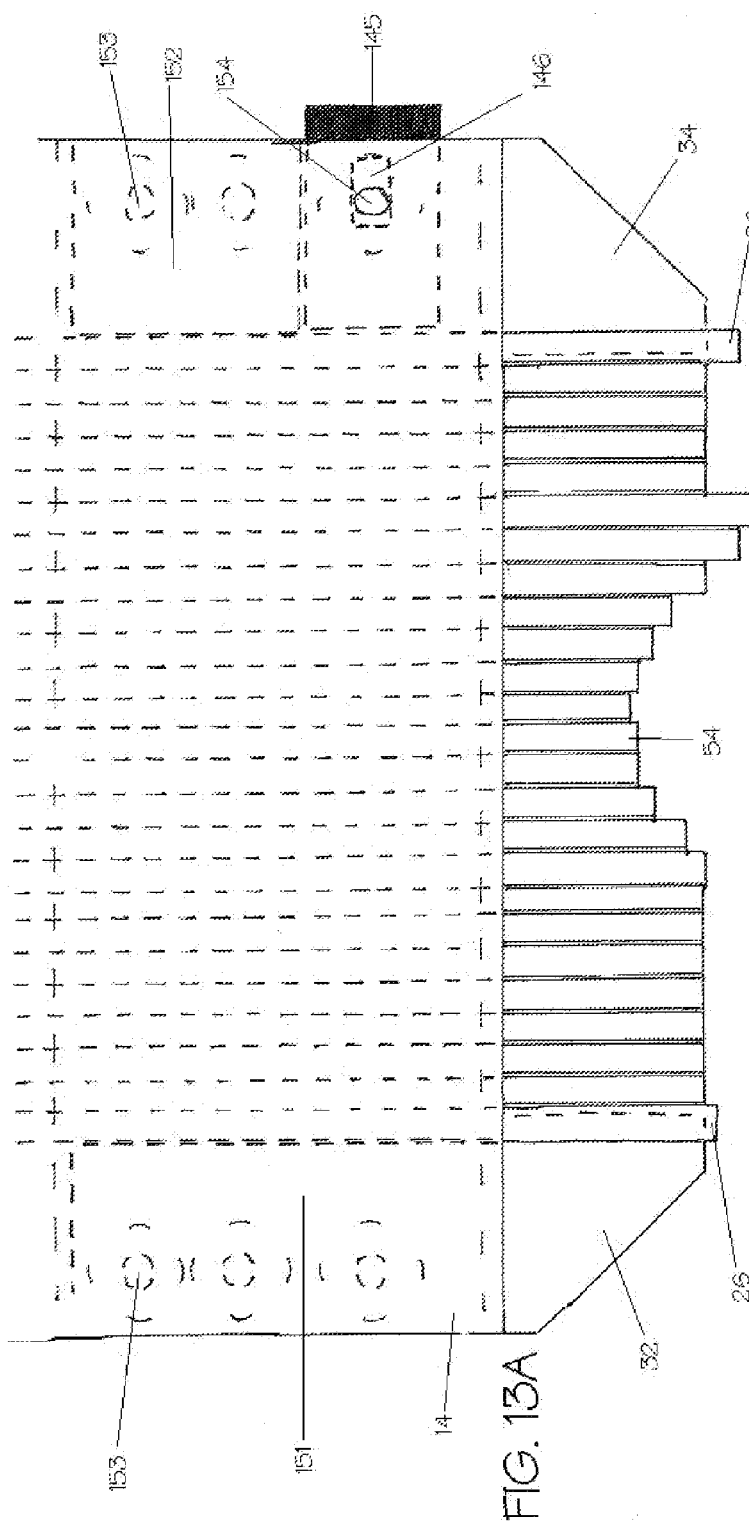
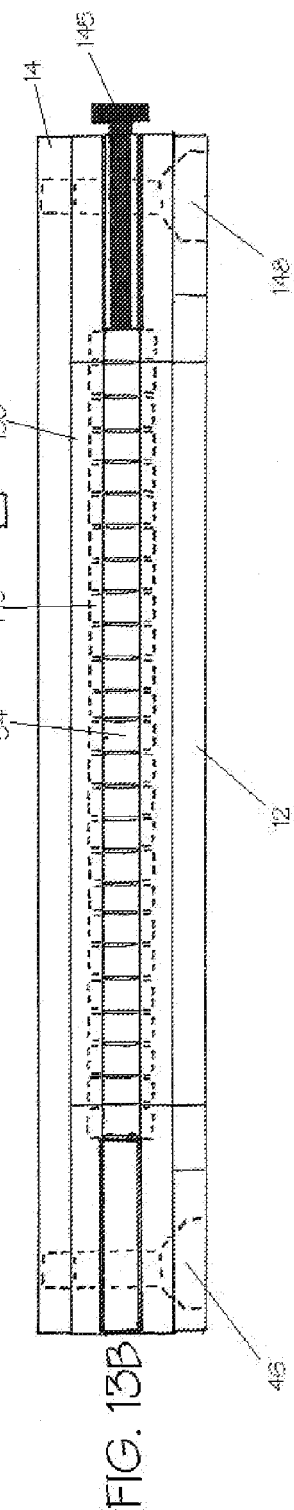
FIG. 13A
FIG. 13B

WELD GAUGE

RELATED APPLICATIONS

Not Applicable.

BACKGROUND OF THE INVENTION

1. Field of the Invention

The present invention relates generally to weld gauges, and more specifically to an improved weld gauge for measuring butt and fillet welds.

2. Background

Determination of weld strength and quality is critical in many instances where welding is used to join two or more structures. In many instances, welding codes and specifications provide for a certain quality or strength of weld. Being able to quickly measure a variety of welds is valuable to a welder or inspector.

Fillet weld strength is generally assessed roughly by determining the cross-sectional area of the weld. The cross-sectional area is determined by the depth of the weld in engagement with each of the planar surfaces, as indicated by the line of juncture between the planar surfaces, and by the depth of the weld at a bisecting angle between the surfaces. Ultimately, a variety of measurements of the contour of a fillet weld provide data that can be used in determining weld strength. Likewise, the strength of a butt weld can also be ascertained by data provided by measurements of the contour of the butt weld.

The ability to rapidly and accurately measure weld characteristics, in order to determine weld strength, is of great value to the industry. Such measurements are often repetitive in nature, but are required to ensure that a weld meets the applicable specifications.

SUMMARY OF THE INVENTION

An improved weld gauge includes a housing having a top, a bottom, a first side edge, and a second opposing side edge. The housing also includes a shoulder at the second side edge. A first cutout is defined in the housing between the first side edge and the second opposing side edge. The cutout includes at least one edge. A second cutout is defined in the housing at the second opposing edge. A plurality of hatches are spaced along the edge of the first cutout. A plurality of pins are slidingly disposed between the top and the bottom of the housing. Each of the plurality of pins has a first end and a second end, and the first end of each of the plurality of pins extends into the second cutout of the housing. The first ends of the pins are positioned to contact a surface to be measured, and measurement of that surface is accomplished by comparing the position of the second ends of the plurality of pins to the hatches.

The top and bottom of the weld gauge may define an interior space therebetween. The first cutout may extend through the top to the interior space of the housing, and the second ends of the plurality of pins extending into the interior space may be visible through the first cutout.

The first cutout may include a first cutout edge, a second cutout edge extending from the first end of the first cutout edge, and a third cutout edge extending from the second end of the first cutout edge. A fourth cutout edge may extend from the third cutout edge, and a fifth cutout edge may extend between the fourth cutout edge and the second cutout edge. The weld gauge may also include a plurality of butt weld hatches extending along the first cutout edge. A plurality of butt weld height hatches may extend along the second cutout edge and the third cutout edge. A plurality of fillet weld leg length hatches may extend along the fourth cutout edge and the fifth cutout edge.

The weld gauge may also include a plurality of butt weld undercut hatches extending along the second cutout edge and the third cutout edge.

The shoulder of the weld gauge may be a first shoulder, and the weld gauge may also include a second shoulder, with the first and second shoulders being at opposing ends of second side edge, with the second cutout disposed between the two shoulders.

The housing of the weld gauge may also include a crosspiece extending between the first side edge and the second opposing side edge. A leg may extend from the crosspiece, and the weld gauge may also include a pin stopper attached to the first side edge of the crosspiece and extending therefrom. The first cutout may be defined between the pin stopper and the leg.

The weld gauge may also include a measurement insert attached to the bottom of the housing and substantially covering the first cutout. The measurement cutout may include a plurality of dimension lines.

The plurality of pins of the weld gauge may include visual indicators along the lengths thereof.

The leg of the weld gauge may be a first leg, and the weld gauge may include a second leg between the second opposing side edge and the first leg. The second cutout may be defined between the second leg and the second opposing side edge. A third cutout may be defined between the second leg and the first leg.

The weld gauge may also include a measurement insert attached to the bottom of the housing and substantially covering the third cutout. This measurement cutout may also include dimension lines.

A weld gauge may also include a housing having a top and bottom surface, and a plurality of pins slidingly engaged with the housing. Each of the plurality of pins have a first end and a second end. The plurality of pins may be visible through a cutout portion of the housing. A plurality of spaced-apart hatches may be disposed along the edge of the cutout portion. The plurality of pins may be contained within the cutout portion and not include portions that extend beyond either of the top or bottom surfaces of the housing. When the first ends of the plurality of pins engage a weld, the position of the second ends of the plurality of pins provides a measurement of the weld.

The plurality of pins may be slidingly engaged with a plurality of bores formed in the housing, and may also be sized and shaped so that the plurality of pins are incapable of movement through the bores.

A depression plate may be provided, collapsibly attached to the underside of the top of the housing. When pressure is applied to the top of the housing, the depression plate collapses against the plurality of pins and restricts their movement. The top of the housing may include openings for receiving attachment of the depression plate.

Each of the plurality of indicator pins may have a quadrilateral cross-section.

The weld gauge may include a compression button that engages the plurality of pins when pressed and biases the plurality of pins against part of the structure of the weld gauge, preventing further movement of the plurality of pins.

The weld gauge may include first and second windows in the bottom surface. The windows may have a plurality of dimension lines associated therewith and each allow visibility of at least one indicator pin. The difference between the positions of indicator pins in each of the windows can be used to measure offset of adjacent structures.

BRIEF DESCRIPTION OF THE DRAWINGS

FIG. 13A is a side view of an embodiment of an improved weld gauge having square pins disposed in a slot and having a compression button.

FIG. 13B is a bottom view of the embodiment of an improved weld gauge depicted in FIG. 13A.

DETAILED DESCRIPTION OF THE INVENTION

For purposes of the present disclosure, certain terms relating to the orientation of the present device may be used. For example, the terms "top" and "bottom" may be used to refer to the embodiments of the present invention described herein. The word "top' refers generally to the side of the device shown in FIG. 1, while the word "bottom" refers generally to the side of the device shown in FIG. 2. The use of the words "top" and "bottom" does not refer to any structural limitations of the device, any limitations on use, or imply that the device must be used or provided in any particular orientation. All such terms are provided only in the interest of clarity.

Figure 1:
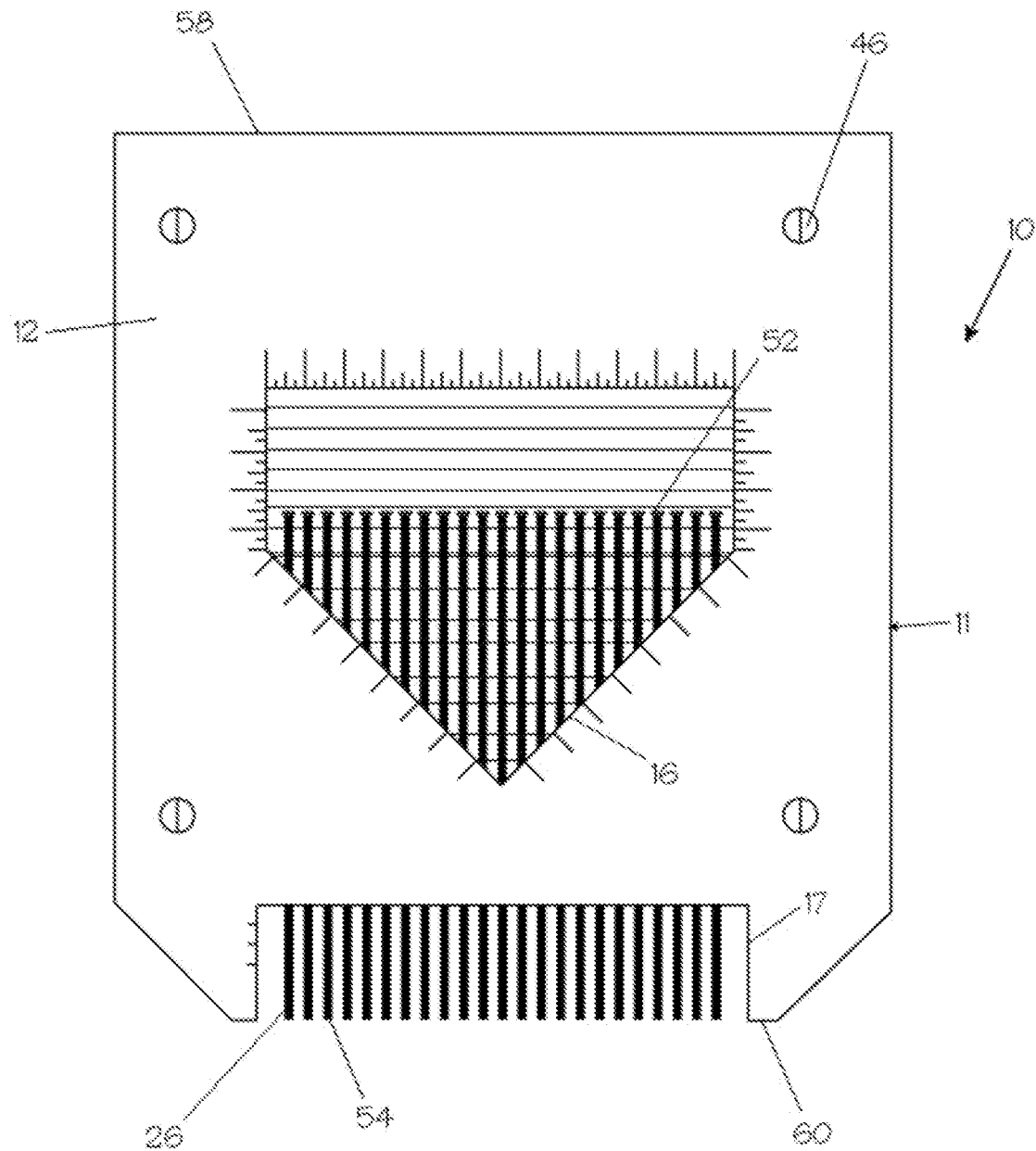
FIG. 1 is a top elevation view one embodiment of an improved weld gauge.

Turning now to the drawings, wherein like numerals indicate like parts, the numeral 10 indicates one embodiment of a weld gauge as described herein. FIG. 1 is a top view of weld gauge 10. Body 11 of weld gauge 10 includes a top cover plate 12 and a bottom cover plate 14 (shown, for example, in FIG. 2 and described below). Top cover plate 12 is attached to bottom cover plate 14 by a plurality of fasteners 46, which extend through apertures (not shown) in the respective cover plates. It is contemplated that any suitable fasteners may be used. Body 11 has a first side edge 58 and a second opposing side edge 60. It should be noted that when referring to the second side edge of body 11, this includes the area defined by the first ends 54 of indicator pins 26 (described below) when they are flush with the portion of body 11 that defines a solid side edge. This same area may be considered an 'edge' of the device even when the pins are not flush, because it defines an outer boundary of functionality of the device.

First spacer 48 and second spacer 50 are provided between cover plate 12 and cover plate 14 such that an interior space is defined between the cover plates when fastened to one another.

Top cover plate 12 has two cutouts—first cover plate cutout 16 and second cover plate cutout 17. First cover plate cutout 16 is located within the body of top cover plate 12, and is preferably enclosed on all sides by a plurality of edges described in greater detail below. Second cover plate cutout 17 is located at one end of weld gauge 10, and is open on one side, having no edge or other obstruction associated with that side. Although the precise characteristics of the first cover plate cutout 16 and second cover plate cutout 17 may vary, in the embodiment shown in the drawings, both first cover plate cutout 16 and second cover plate cutout 17 are formed only in top cover plate 12. Bottom cover plate 14 is formed of a single portion of material having no cutouts therein.

Weld gauge 10 includes a plurality of indicator pins 26 disposed between top cover plate 12 and bottom cover plate 14. Indicator pins 26 preferably extend through bores in first spacer 48, the bores serving to keep indicator pins 26 properly aligned and in their proper relative positions. Indicator pins 26 slide within the bores, allowing for movement of indicator pins 26 substantially along their lengths. As shown in the drawings, indicators pins 26 each have a first end 54 that extends into second plate cutout 17 and may be flush therewith, and a second end 52 that extends into first plate cutout 16. The positions of the various indicator pins 26 are used to measure a weld, as described in greater detail below.

As shown in the drawings, first cover plate cutout 16 includes a plurality of edges useful in determining the dimensions of a weld being measured. Each of the plurality of edges includes a plurality of hatches providing a measurement of dimensions along the length of the edge. First cutout edge 36, for example, may include a plurality of width dimension hatches extending along the length thereof. Second cutout edge 38 and third cutout edge 40 may include a plurality of height dimensions hatches 18 extending along the majority of their lengths, with a plurality of undercut dimension hatches 22 extending only over a small portion of the lengths thereof where second cutout edge 38 and third cutout edge 40 meet fifth cutout edge 44 and fourth cutout edge 42, respectively. Fourth cutout edge 42 and fifth cutout edge 44 may include a plurality of leg length dimension hatches 24 extending along a length thereof.

Figure 2:
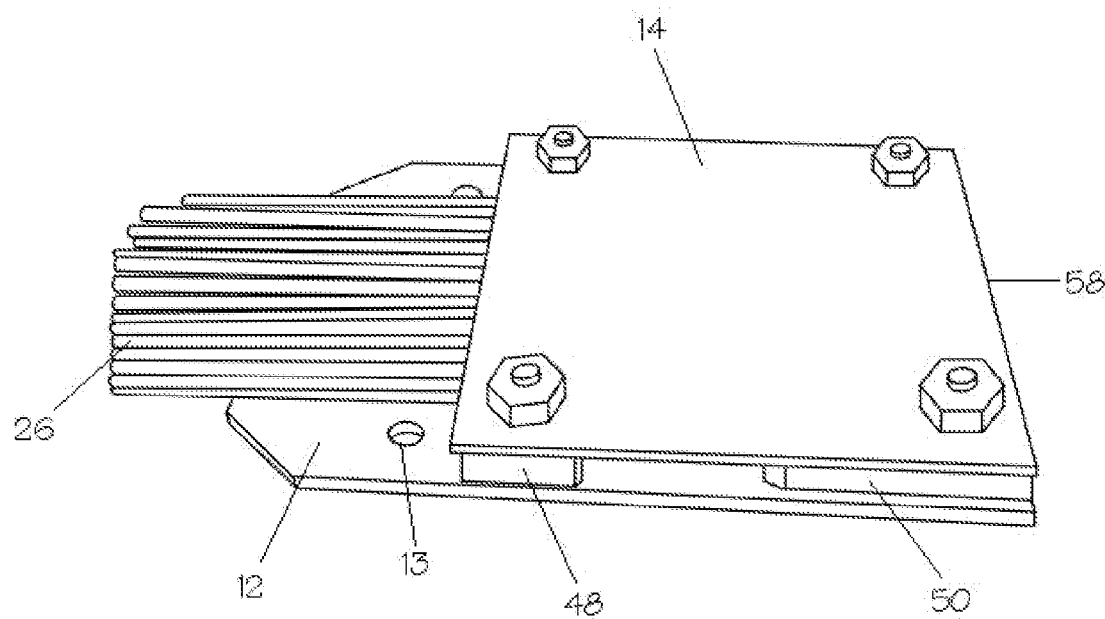
FIG. 2 is a bottom perspective view of the embodiment of the improved weld gauge of FIG. 1.
Figure 3:
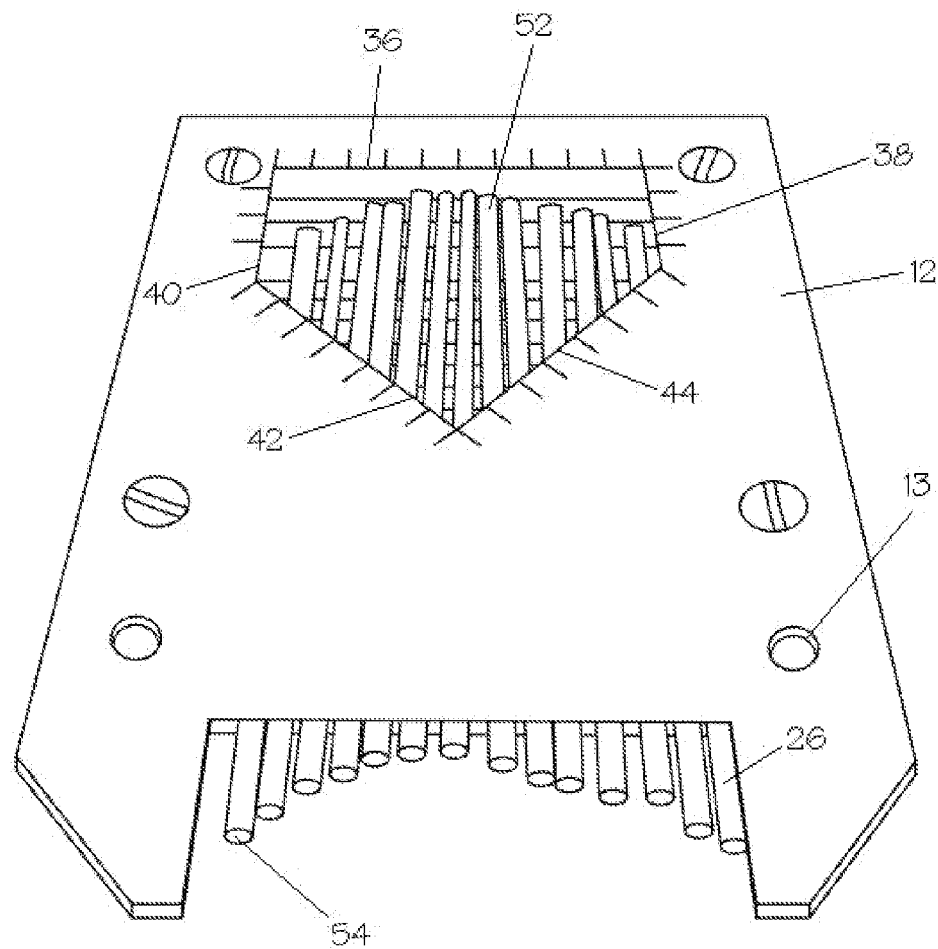
FIG. 3 is a front perspective view of the embodiment of the improved weld gauge of FIG. 1.

FIGS. 2 and 3 show other views of weld gauge 10, so that various other features of weld gauge 10 are visible, and FIG. 3 also provides labels for the various edges of first plate cutout 16, described above. FIG. 2 shows weld gauge 10 from the bottom, showing bottom cover plate 14 and the plurality of fasteners 46 that affix bottom cover plate 14 to first cover plate 16. First spacer 48 and second spacer 50 are also visible, and it can be seen that the presence of the spacers forms a gap or interior space between top cover plate 12 and bottom cover plate 14. FIGS. 2 and 3 also show depression plate openings 13, adapted to receive depression plate 62, which is described in more detail with respect to FIG. 9, below.

FIG. 3 is a perspective view of weld gauge 10. Top cover plate 12 and bottom cover plate 14 are again shown, as are the various edges of first cover plate cutout 16 and the associated hatches.

Figure 4:
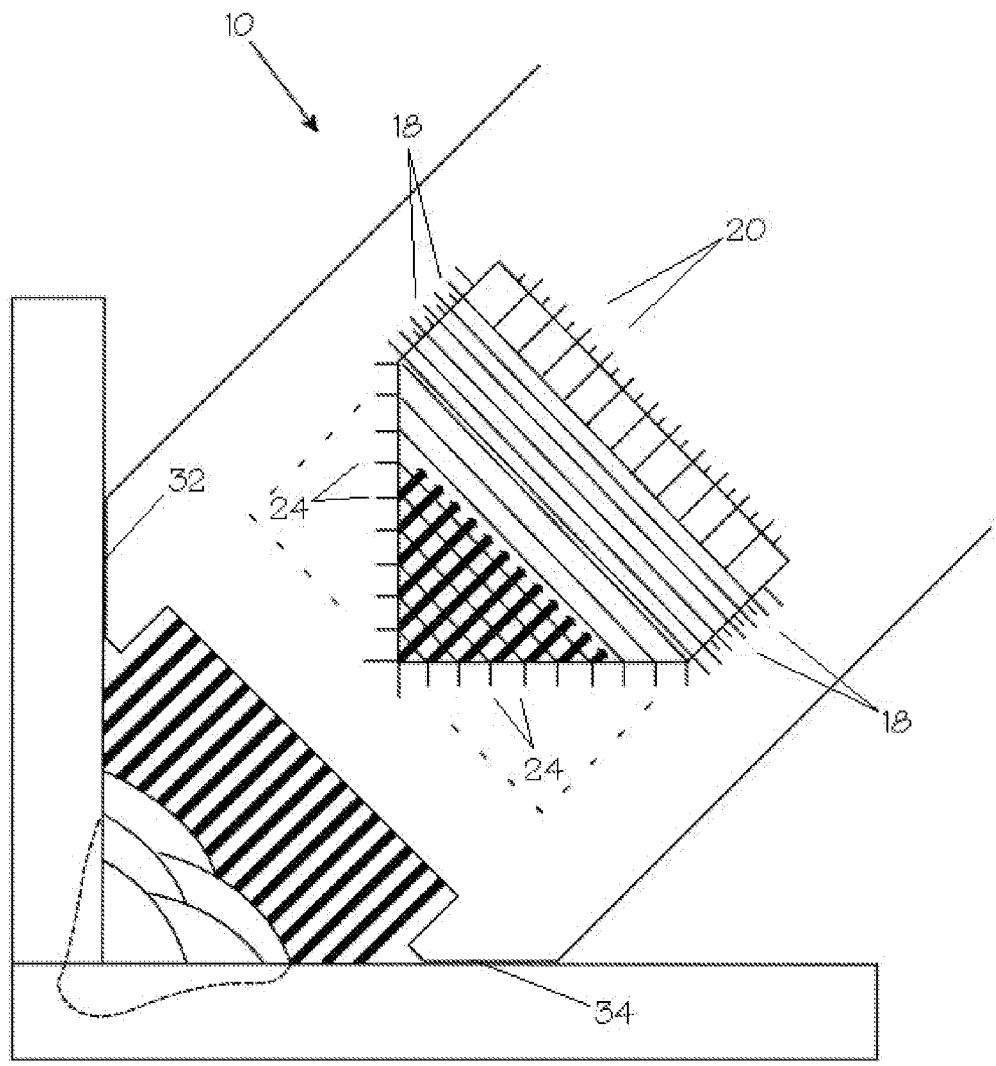
FIG. 4 is a side view of one embodiment of an improved weld gauge as used to measure a fillet weld.
Figure 5:
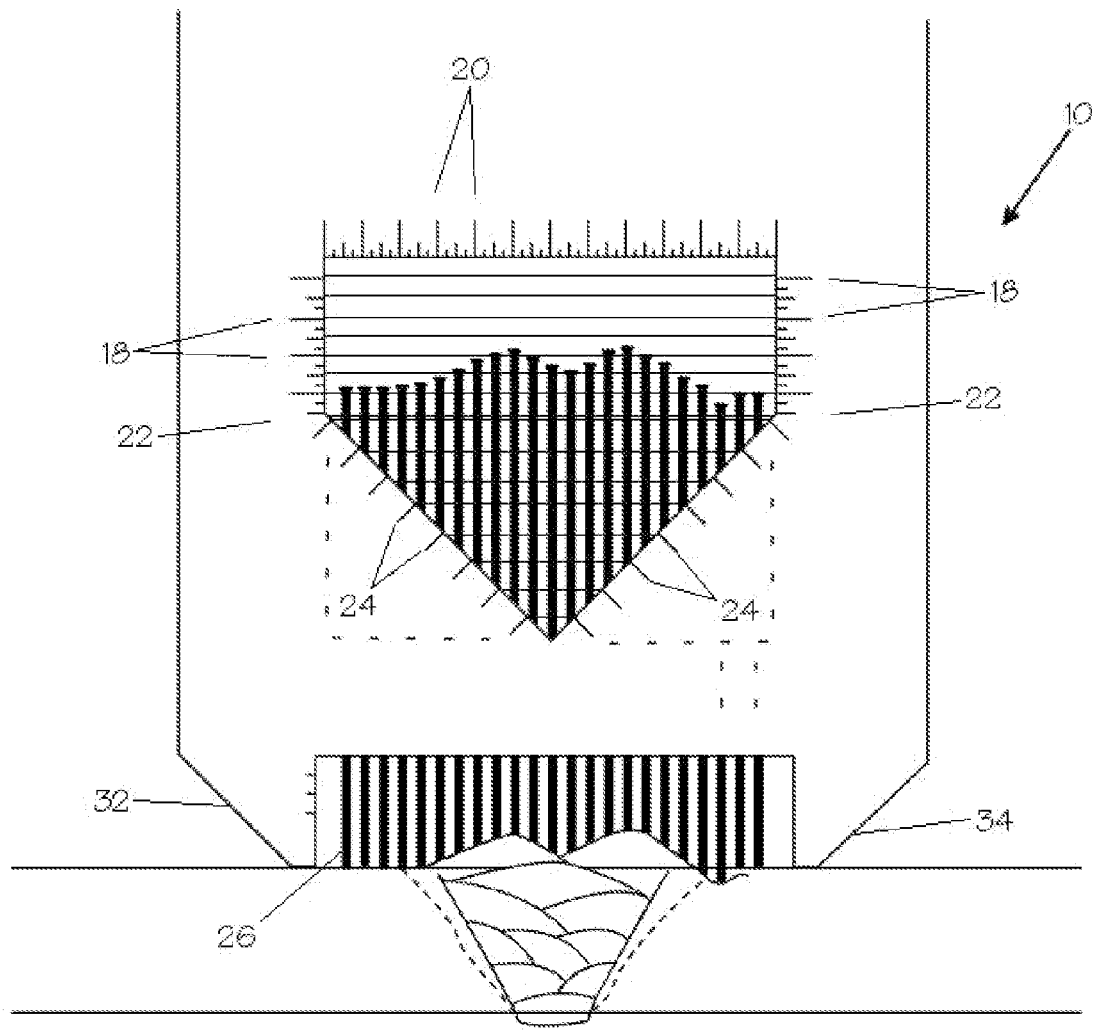
FIG. 5 is a side view of one embodiment of an improved weld gauge as used to measure a butt weld.

FIGS. 4 and 5 show weld gauge 10 in use and also provide exemplary dimensions along the lengths of the various edges of first plate cutout 16. Along first cutout edge 36, width dimension hatches 20 are provided at 1/16" intervals, with larger width dimension hatches 20 provided at 1/8" intervals and width dimension hatches 20 that are larger still provided at ¼" intervals. The zero point of the scale is at the center of first cutout edge 36, and hatches 20 extend away from the zero point in both directions.

Second cutout edge 38 and third cutout edge 40 both include a plurality of height dimension hatches 18 along a portion of the lengths thereof. In the embodiment shown in FIGS. 4 and 5, height dimension hatches 18 are spaced apart at ¹⁄₃₂" intervals. Larger height dimension hatches 18 are provided at ¹⁄₁₆" intervals, with still larger height dimension hatches 18 provided at ⅛" intervals. The zero point on the scale is shown ¹⁄₁₆" from where second cutout edge 38 and third cutout edge 40 meet fifth cutout edge 44 and fourth cutout edge 42, respectively. The height dimension hatches 18 extending from the zero point toward first cutout edge 36 are positive measurements, while two undercut dimension hatches 22 (best seen in FIG. 5) extend away from the zero point in the other direction.

Fourth cutout edge 42 and fifth cutout edge 44 include a plurality of leg length dimension hatches 24 extending along the length thereof. The zero point of the scale is at the intersection of fourth cutout edge 42 and fifth cutout edge 44, and leg dimension hatches 24 extend away from that point, along both edges, at ⅛" intervals.

While the embodiment of weld gauge 10 shown in FIGS. 4 and 5 include certain dimension marking, as described above, it is contemplated that the present device may include any desired dimensions or scale. Further, the numerical value of given hatches may be provided, as shown in the figures, or the hatches alone may be provided, with a key for the values of each hatch mark provided separately. Further, the zero point of each scale may be varied, if desired, and in some embodiments of the invention, leg dimension hatches may be omitted, so that second cutout edge 38 and third cutout edge 40 have only height dimension hatches along the lengths thereof.

In addition to providing exemplary dimension hatches, and the placement thereof, FIGS. 4 and 5 also show exemplary usages of one of embodiment of weld gauge 10 in measuring a fillet or butt weld, respectively. In FIG. 4, weld gauge 10 is shown as used for measuring a fillet weld at the intersection of two perpendicular plates. First shoulder 32 and second shoulder 34 of weld gauge 10 are in contact with the plates, allowing for the positioning of weld gauge 10 at the proper location between the two plates. The positions of the various indicator pins 26 allow the user of the device to measure the weld. It should be noted that the methods for calculating weld strength or making other calculations based on the dimensions provided by weld gauge 10 are well known in the art.

In FIG. 5, weld gauge 10 is shown in use for measuring a butt weld. When used with a butt weld, first shoulder 32 and second shoulder 34 do not contact the plates being welded, because the plates are along substantially the same plane and joined at the end. Again, the positions of the various indicator pins 26 allow the user of the device to measure the weld.

Figure 8:
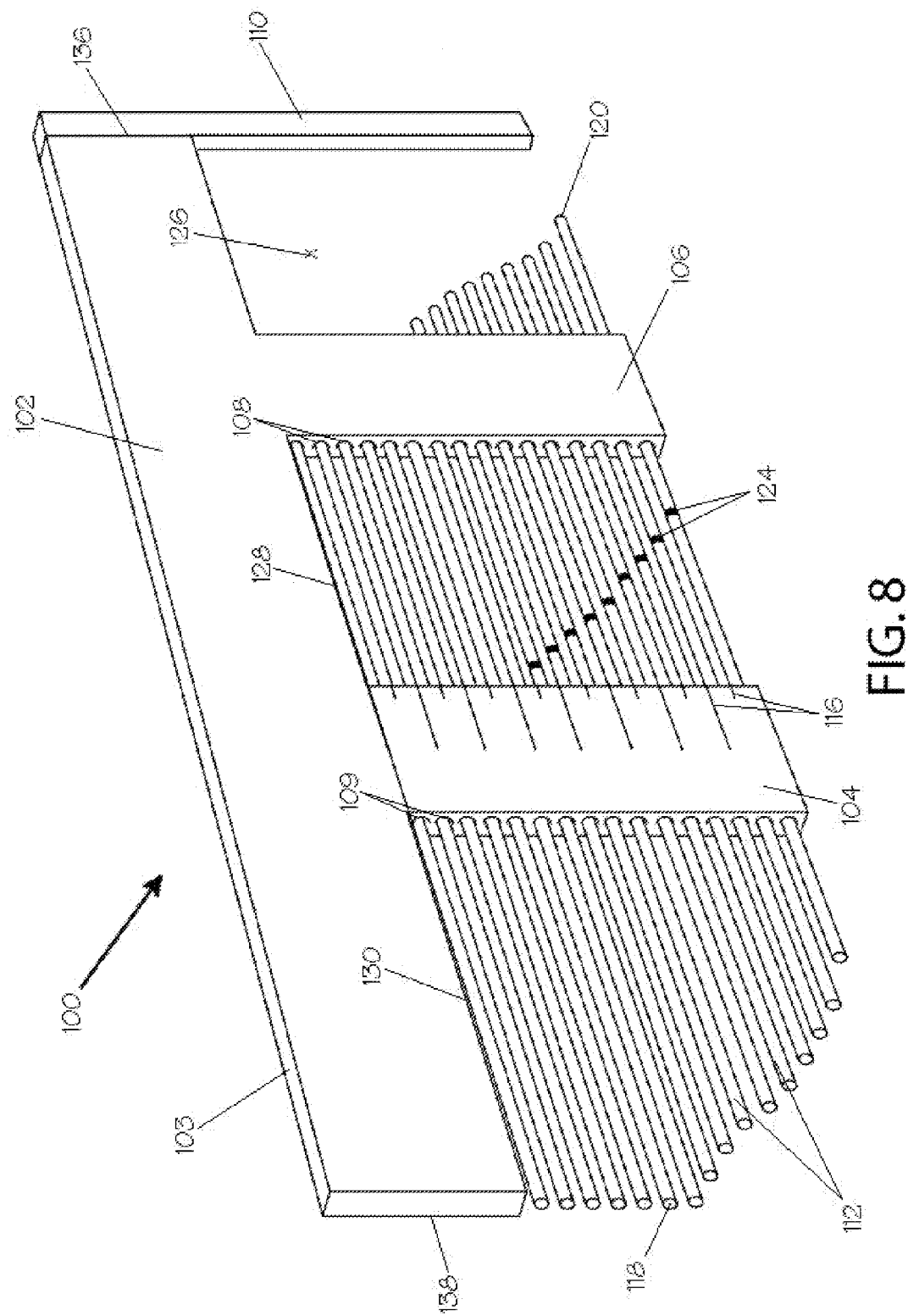
FIG. 8 is a side perspective view of another embodiment of an improved weld gauge.

FIG. 8 provides a perspective view of partially-complete weld gauge 100, another embodiment of a weld gauge within the scope of the present invention. For purposes of the description herein, the "top" surface of the embodiment will be considered to be that surface facing the viewer of the accompanying drawings, while the "bottom" surface will be the opposite surface.

Weld gauge 100 includes a body 103 that has a double-T shape, with a single crosspiece 102 extending along the length of weld gauge 100, and two spaced-apart legs 104 and 106 extending from crosspiece 102. Crosspiece 102 extends from a first edge 136 of body 103 to a second opposing edge 138 of body 103. In this embodiment of weld gauge 100, second edge 138 of body 103 may also be referred to as a shoulder. It should be noted that when referring to the second opposing edge 138 of body 103, this includes the area defined by the first ends of indicator pins 112 (described below) when they are flush with the portion of body 103 that defines a solid side edge. This same area may be considered an 'edge' of the device even when the pins are not flush, because it defines an outer boundary of functionality of the device.

First leg 104 includes a plurality of bores 109 extending therethrough as shown in the drawings, while second leg 106 includes an equal number of bores 108 in alignment with bores 109 of first leg 104.

A plurality of indicator pins 112 are provided, each having a first end 118 and a second end 120, and extending through bores 108 and bores 109. Indicator pins 112 are capable of sliding movement within bores 108 and 109, and this movement of indicator pins 112 allows measure of a weld using weld gauge 100. A pin stopper 110 is affixed to a first end of weld gauge 100, attached to a first end of crosspiece 102 and extending away therefrom in the same direction as legs 104 and 106. Pin stopper 110 prevents indicator pins 112 from moving so far in one direction that they come free of bores 108 or 109. Second ends 120 of indicators pins 112 contact pin stopper 110 when indicator pins 112 have moved sufficiently in that direction, and further movement of indicator pins 112 is prevented.

Second ends 120 of indicator pins 112 may also have a mechanism for preventing indicator pins 112 from moving too far in the other direction, away from pin stopper 110. For example, second ends 120 of indicator pins 112 may be flattened or otherwise deformed so as to be incapable of passing through bores 108. Alternatively, a bead or other structure may be attached to second ends 120 of indicator pins 112, the bead or other structure being too large to pass through bores 108. Second ends 120 may also simply be shaped such that they cannot pass through bores 108. Indicator pins 112 are disposed parallel to crosspiece 102, and first ends 118 of indicator pins 120 extend to a distance flush with second end of crosspiece 102 when indicator pins 112 are fully extended in that direction.

Figure 6:
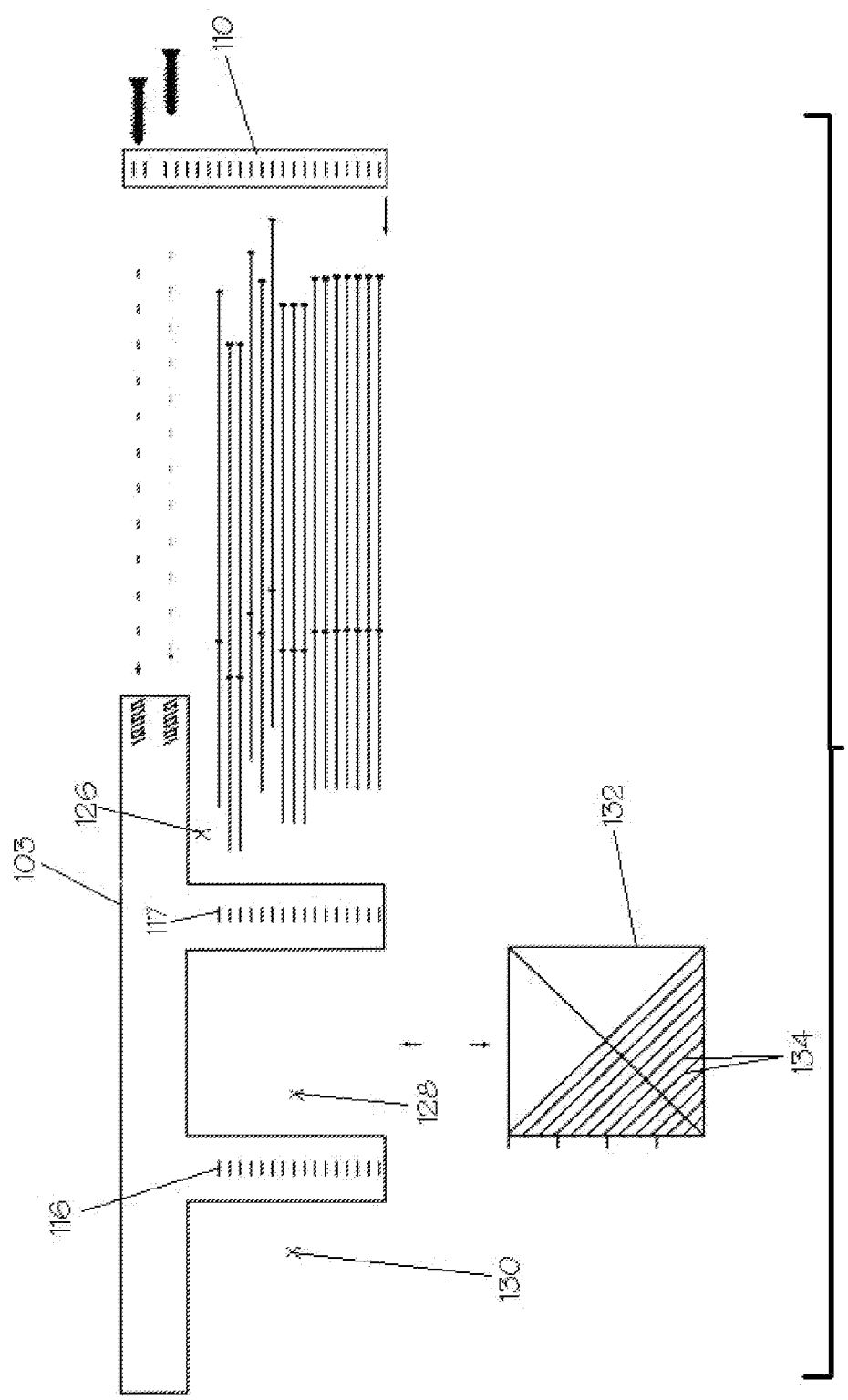
FIG. 6 is an exploded view of the embodiment of an improved weld gauge of FIG. 8.

When assembled as shown in FIG. 6, weld gauge 100 defines three cutout areas. The first cutout 126 is between pin stopper 110 and second leg 106, second cutout 128 is between second leg 106 and first leg 104, and third cutout 130 is at the open, second end of weld gauge 100, extending from the opposite side of first leg 104 as second cutout 128.

Figure 7:
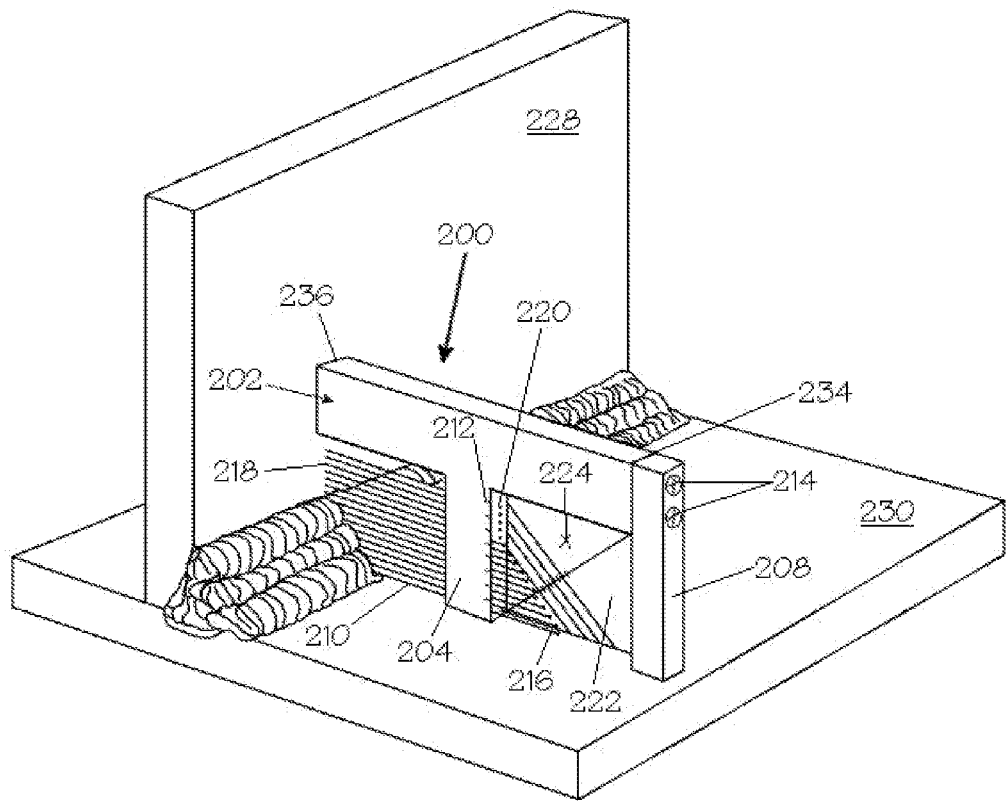
FIG. 7 is a perspective view of another embodiment of an improved weld gauge as shown in use measuring a fillet weld.

FIG. 6 shows an exploded view of the components of the embodiment of weld gauge 100 shown in FIG. 8. In addition to the components shown in FIG. 8, FIG. 6 also depicts a measurement insert 132 having a plurality of dimension lines 134 inscribed thereon. Measurement insert 132 is affixed to weld gauge 100 at second cutout 128, and may be attached to one flat side of weld gauge 100 or be flush therewith, so that dimension lines 134 are visible through second cutout 128 with indicator pins 112 disposed thereover. Measurement insert 132 substantially covers the cutout over which it is affixed, by which it is understood that the measurement insert 132 may fully cover the cutout or may leave small portions thereof uncovered. Indicator pins 112 may include visual indicators 124 (best shown in FIG. 8) along the length thereof to provide a reference point along the length of each indicator pin 112. The position of visual indicators 124 with respect to the dimension lines 134 of measurement insert 132 allows certain measurements of a weld using weld gauge 100. Although as shown in FIG. 7, measurement insert 132 has dimension lines 134 spaced apart at ⅛" intervals, it is contemplated that other arrangements of dimension lines 134 may be used. In some embodiments of the invention, a weld gauge 100 may be provided with a plurality of measurement inserts, each having different dimension line markings, and each being capable of removable attachment to weld gauge 100 when a given set of dimension lines is desired.

First leg 104 and second leg 106 each may include a plurality of hatches along the lengths thereof, for use in further measurement of a weld using weld gauge 100. In the embodiment shown in FIG. 6, first leg 104 includes first hatches 116 spaced apart at 1/16" intervals. Second leg 106 includes second hatches 117, likewise spaced apart at 1/16" intervals.

In the exemplary embodiment shown in FIG. 6, the dimensions of weld gauge 100 provide a device suitable for fillet weld measurement. While these dimensions may vary depending on the specific use to which weld gauge 100 is put, exemplary, non-limiting, dimensions are provided here to provide the information necessary to construct the exemplary embodiment. In the embodiment shown in FIG. 6, crosspiece 102 is 3½" long (not including pin stopper 110), and from the top to bottom (with "top" and "bottom" referring to the orientation shown in the drawings), crosspiece 102 is ¼" wide. Cutouts 126, 128, and 130 are each 1" by 1", square, and legs 104 and 106 therefore extend 1" from crosspiece 102. Legs 104 and 106 are ¼" wide. Pin stopper 110 is 1¼" long and 1/8" wide. Indicator pins 112 are 2½" long, with visual indicators 124 provided 1¼" from second ends 120 thereof. Measurement insert 132 is 1" by 1", square. The diameter of indicators pins 112 is 0.058". The thickness of the body components of the present device may vary and is not provided here.

FIG. 7 depicts another embodiment 200 of a weld gauge within the scope of the present invention. For purposes of the description herein, the "top" surface of the embodiment will be considered to be that surface facing the viewer of the accompanying drawings, while the "bottom" surface will be the opposite surface.

Weld gauge 200 is similar to weld gauge 100, described above, except that it is generally T-shaped and includes only two cutout portions instead of three. As can be seen in the drawings, body 202 includes a leg 204 extending therefrom, and has a pin stopper 208 attached to a first end 234 thereof by fasteners 214. Leg 204 includes a plurality of bores 220, through which indicator pins 210 extend. A measurement insert 222 is provided, affixed over first cutout 224 such that first ends 216 of indicator pins 210 extend over the dimension lines of measurement insert 222 to provide certain measurements of a fillet weld. Leg 204 includes a plurality of spaced-apart hatches 212 that also allow for measurement of a fillet weld.

Weld gauge 200 is shown in FIG. 7 as it would be used in measuring a fillet weld. First plate 228 and second plate 230 are perpendicular, forming a ninety-degree angle where they meet. Fillet weld 232 joins the plates where they meet. As shown in the figure, a second end 236 of body 202 contacts first plate 228. First ends 218 of at least some of indicator pins 210 contact fillet weld 232. Contact with fillet weld 232 causes movement of indicator pins 210, and the positions thereof can be used to make measurements of the fillet weld.

Figure 9:
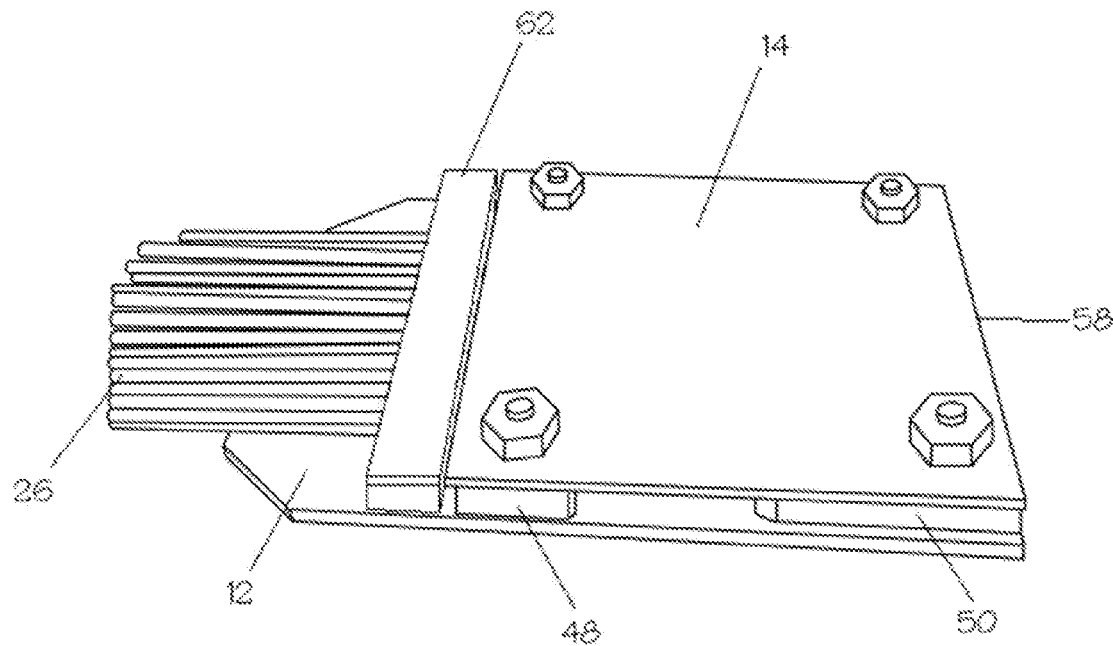
FIG. 9 is a bottom perspective view of one alternate embodiment of the improved weld gauge of FIG. 1 having a depression plate included therewith.

FIG. 9 depicts an alternate embodiment of the present weld gauge having a depression plate 62 affixed to the underside of top cover plate 12. In the embodiment shown, depression plate 62 is affixed to depression plate openings 13 shown in FIGS. 2 and 3. It should be noted that some embodiments of the present invention may be provided and used precisely as shown in FIGS. 2 and 3, with openings 13 provided for removable attachment of depression plate 62, but with not depression plate attached. Alternatively, some embodiments intended for use without a depression plate 62 may lack openings 13.

In the embodiment of the present device shown in FIG. 9, wherein depression plate 62 is included, the depression plate may be used to prevent movement of pins 26 once the user has placed the weld gauge against a weld. The user simply applies pressure to top cover plate 12, which pushes the device downward. Depression plate 62 has a collapsible motion with respect to its attachment to openings 13, and when pressure is applied to cover plate 12, depression plate 62 collapses against pins 26, holding them with varying degrees of firmness depending on the amount of pressure applied. This allows for the user of the weld gauge to lift the gauge away from the weld without disturbing the measurement. It also allows a user the ability to control the friction on pins 26 so they do not slide backward when measuring overhead or upside-down welds.

Figure 10:
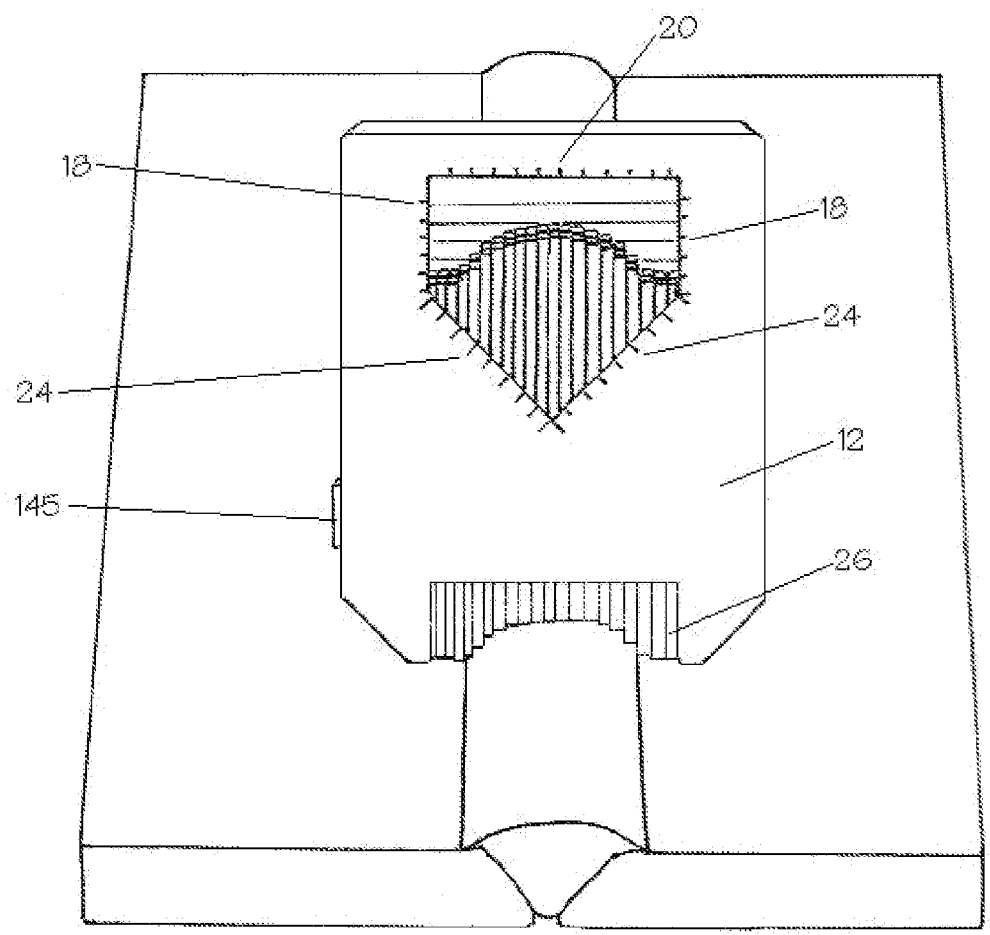
FIG. 10 illustrates another embodiment of an improved weld gauge as used in measuring a butt weld.

FIG. 10 depicts another embodiment of a weld gauge of the present invention having a compression button 145 associated therewith. By applying pressure to compression button 145, such as, for example, by pressing against compression button 145 with a thumb, a user is able to 'lock' indicator pins 26 into position after measurement of a weld.

Figure 11:
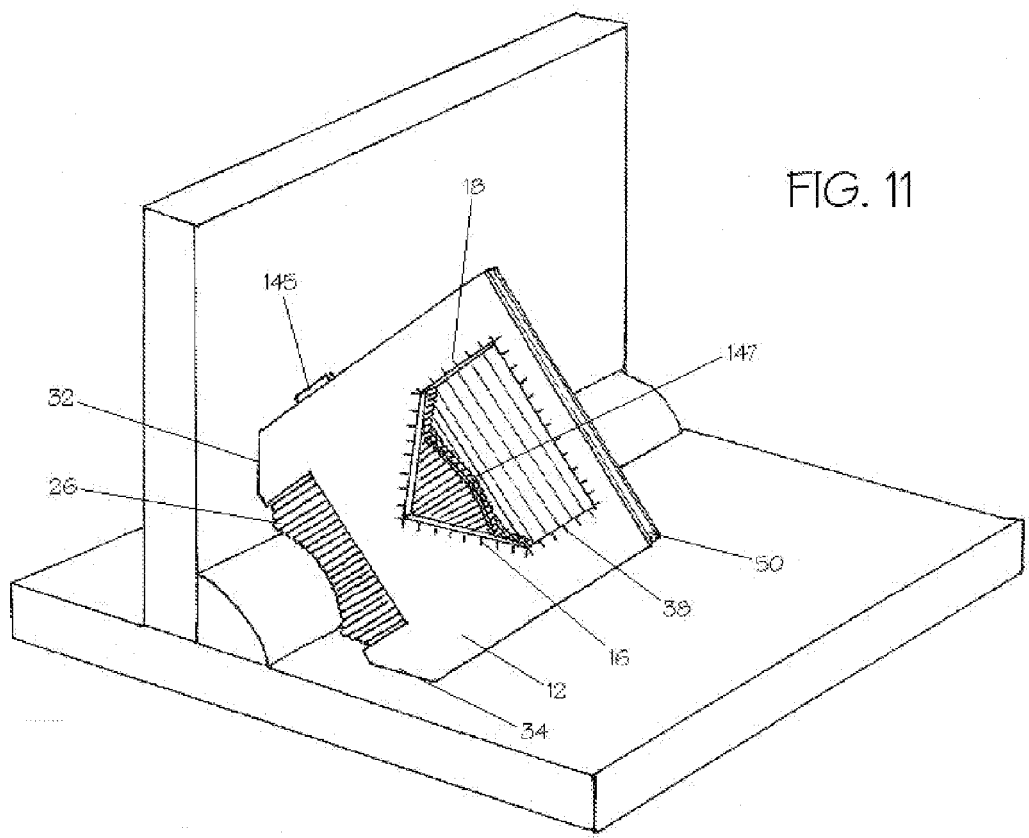
FIG. 11 illustrates one embodiment of an improved weld gauge measuring a fillet weld.

FIG. 11 shows the embodiment of an improved weld gauge, as shown in FIG. 10, measuring a fillet weld. In addition to compression button 145, it can be seen that indicator pins 26 include head portions 147 to prevent the pins from exiting the device through the slot through which indicator pins 26 extend. In this embodiment of an improved weld gauge, it is preferred that indicator pins 26 extend through a single slot large enough to encompass all of the indicator pins 26, rather than through individual openings.

Figure 12:
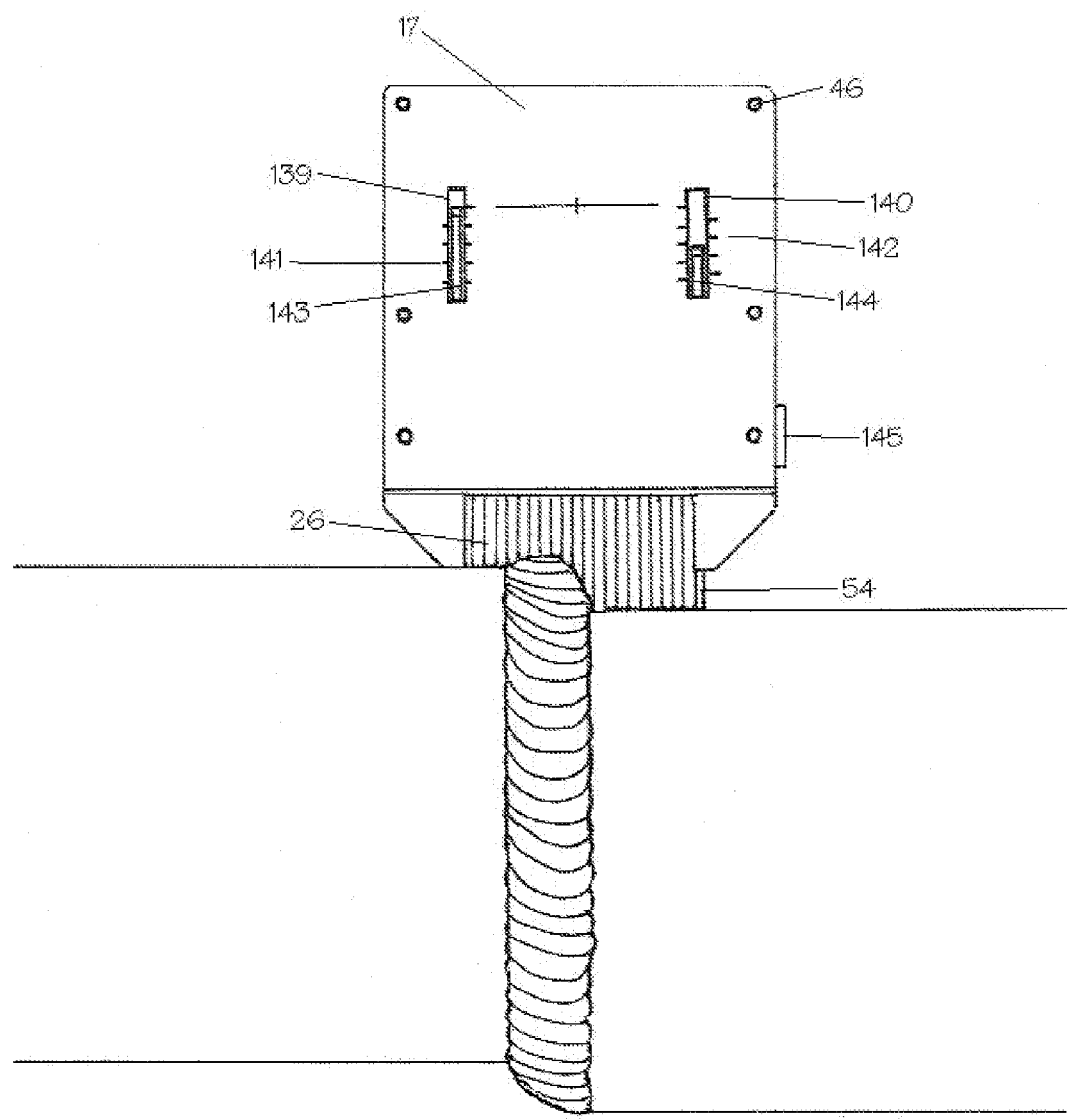
FIG. 12 illustrates the rear of an embodiment of an improved weld gauge measuring pipe offset.

FIG. 12 depicts an embodiment of an improved weld gauge adapted to measure the amount of offset between adjustment pipes (also referred to as "Hi-Low" measurement). The improved weld gauge includes rear windows 139 and 140, provided with dimension hatches 141 and 142, respectively, on an outer edge of the window, and dimension hatches 143 and 144, respectively, on the inner edges of each. The amount of offset between the pipes can be determined by comparing the measurements in each window.

FIG. 13a shows a close side view of an embodiment of an improved weld gauge having square indicator pins 26 and a compression button 145 for holding the indicator pins in place. FIG. 13b shows a bottom view of the embodiment of FIG. 13a, and shows one method of operation of compression button 145, wherein compression button 145 has an extended portion that contacts one of indicator pins 26, allowing the indicator pins to be compressed, as a whole, against a surface on the opposite side of the weld gauge.

Any of the embodiments of a weld gauge described herein may include a body constructed from a single, unitary piece of material such as wood or aluminum. Alternatively, it is contemplated that a plurality of separate parts may be used to provide the structure described herein. Further, it is contemplated that in some embodiments of the present weld gauge, the indicator pins are contained entirely within the cutout portions of the device, when viewing the device across its thickness from top to bottom, so that no portion of the pins or other structures associated therewith extend beyond the top or bottom surfaces of the device. This allowed the present device to be readily used in tight spaces where a device with protruding portions extending beyond the top and bottom surfaces may not fit.

The foregoing provides exemplary descriptions of a number of embodiments of the invention, and is meant to be illustrative and to provide clarity in understanding the invention. The descriptions and accompanying figures provided

Having thus described the preferred embodiment of the invention, what is claimed as new and desired to be protected by Letters Patent includes the following:

1. A weld gauge comprising:
    a housing having a top, bottom, first side edge and a second opposing side edge, the housing further comprising a shoulder at the second side edge thereof;
    a first cutout defined in the housing between the first side edge and the second opposing side edge, the cutout comprising at least one edge and exposing a plurality of dimension lines on an interior surface of the housing;
    a second cutout defined in the housing at the second opposing side edge;
    a plurality of hatches spaced along the edge of the first cutout;
    a plurality of pins slidingly disposed between the top and bottom of the housing, each of the plurality of pins having a first end and a second end, the first end of each of the plurality of pins extending into the second cutout of the housing;
    wherein the first ends of the pins are positioned to contact a surface to be measured, and further wherein measurement of the surface to be measured is accomplished by comparing the position of the second ends of the plurality of pins to the dimension lines.

2. The weld gauge according to claim 1, wherein the top and bottom define an interior space therebetween, and further wherein the first cutout extends through the top to the interior space, the second ends of the plurality of pins extending into the interior space and being visible through the first cutout.

3. The weld gauge according to claim 2, wherein the first cutout comprises a first cutout edge, a second cutout edge extending from a first end of the first cutout edge, a third cutout edge extending from a second end of the first cutout edge, a fourth cutout edge extending from the third cutout edge, and a fifth cutout edge extending between the fourth cutout edge and the second cutout edge, the plurality of hatches further comprising:
    a plurality of butt weld width hatches extending along the first cutout edge;
    a plurality of butt weld height hatches extending along the second cutout edge and the third cutout edge; and
    a plurality of fillet weld leg length hatches extending along the fourth cutout edge and the fifth cutout edge.

4. The weld gauge according to claim 3 further comprising a plurality of butt weld undercut hatches extending along the second cutout edge and the third cutout edge.

5. The weld gauge according to claim 1 wherein the shoulder is a first shoulder, and further wherein the second side edge comprises a second shoulder, the first and second shoulders being at opposing ends of the second side edge with the second cutout disposed therebetween.

6. The weld gauge according to claim 1 wherein the placement of the plurality of pins is such that when the second ends of each of the plurality of pins is flush with the second opposing edge of the housing, the weld gauge provides a butt weld measurement of zero.

7. The weld gauge according to claim 6 wherein the placement of the plurality of pins is such that when the first ends of each of the plurality of pins are flush with an edge of the first cutout, the weld gauge provides a ninety-degree fillet weld measurement of zero.

8. The weld gauge according to claim 7, further comprising a measurement insert attached to the bottom of the housing and substantially covering the second cutout, the measurement insert comprising a plurality of dimension lines.

9. The weld gauge according to claim 8, wherein at least a portion of said plurality of pins comprises a visual indicator along at least a portion of a length thereof.

10. The weld gauge according to claim 1, wherein each of said plurality of pins has a quadrilateral cross-section.

11. The weld gauge according to claim 1, further comprising a compression button adapted to engage said plurality of pins at a first side thereof when pressure is applied to said button, the engagement with said plurality of said pins preventing or reducing movement of said plurality of pins.

12. The weld gauge according to claim 1, further comprising first and second windows in said bottom thereof, each of said windows having a plurality of dimension hatches associated therewith, wherein at least one of said plurality of pins is visible through each of said first and second windows, and further wherein comparison of the measurement of the at least one pin visible through the first window and the at least one pin visible through the second window provides an offset measurement for a surface being measured using said weld gauge.

13. The weld gauge according to claim 1, further comprising:
    a depression plate collapsibly attached to an underside of the top of said housing, such that a portion of said plurality of pins are disposed between the depression plate and said underside of the top of said housing,
    wherein when pressure is applied to the top of said housing, the depression plate collapses against said pins, restricting movement thereof.

14. The weld gauge according to claim 13, further comprising a depression plate opening defined in said top, the depression plate engaging said depression plate opening.

15. A weld gauge comprising:
    a housing having a top, bottom, first side edge and a second opposing side edge, the housing further comprising a shoulder at the second side edge thereof;
    a first cutout defined in the housing between the first side edge and the second opposing side edge, the cutout comprising at least one edge;
    a second cutout defined in the housing at the second opposing side edge;
    a plurality of hatches spaced along the edge of the first cutout;
    a plurality of pins slidingly disposed between the top and the bottom of the housing, each of the plurality of pins having a first end and a second end, the first end of each of the plurality of pins extending into the second cutout of the housing;
    a crosspiece extending between the first side edge and the second opposing side edge of the housing, and a leg extending from the crosspiece
    a pin stopper attached to the first side edge of the crosspiece and extending therefrom; and
    a measurement insert attached to the bottom of the housing and substantially covering the first cutout, the measurement insert comprising a plurality of dimension lines,
    wherein the first cutout is defined between the pin stopper and the leg, and further wherein the first ends of the pins are positioned to contact a surface to be measured and measurement of the surface to be measured is accomplished by comparing the position of the second ends of the plurality of pins to the hatches.

16. The weld gauge according to claim 15, wherein the leg is a first leg, and further comprising a second leg between the second opposing side edge and the first leg, wherein the second cutout is defined between the second leg and the second opposing side edge, and a third cutout is defined between the second leg and the first leg.

17. A weld gauge comprising:
    a body having a top and a bottom and comprising a crosspiece extending from a first edge of the body to a second, opposing edge of the body, and a leg extending from the crosspiece;
    a pin stopper attached to the first edge of the body and extending therefrom;
    a first cutout defined between the pin stopper and the leg;
    a second cutout defined between the leg and the second opposing edge;
    a plurality of pins, each of the plurality of pins having a first end and a second end, each of the plurality of pins extending from a first end thereof disposed within the second cutout, through the leg to a second end of each of the plurality of pins disposed within the first cutout;
    a measurement insert attached to the bottom of the body and substantially covering the first cutout, the measurement insert comprising a plurality of dimension lines; and
    a plurality of hatches disposed in spaced-apart relation along the leg.

18. The weld gauge according to claim 17, wherein the leg is a first leg, and further comprising a second leg between the second edge of the body and the first leg, wherein the second cutout is defined between the second leg and the second edge of the body, and a third cutout is defined between the second leg and the first leg, and further wherein said plurality of pins extend through the second leg to the second edge of the body.

19. A weld gauge comprising:
    a housing comprising a top surface and a bottom surface, a first side edge, and a shoulder extending from the first side edge;
    a plurality of pins slidingly engaged with the housing, each of the plurality of pins having a first end and a second end; and
    a cutout portion through which the second ends of the plurality of pins are visible,
    wherein the first edge is configured to act as a reference point contacting a work surface when measuring a butt weld, and further wherein the shoulder is configured to act as a reference point contacting a work surface when measuring a fillet weld.

* * * * *